Oct. 30, 1928.
H. D. BROWN
1,689,518
RECTIFYING SYSTEM
Filed Feb. 5, 1927
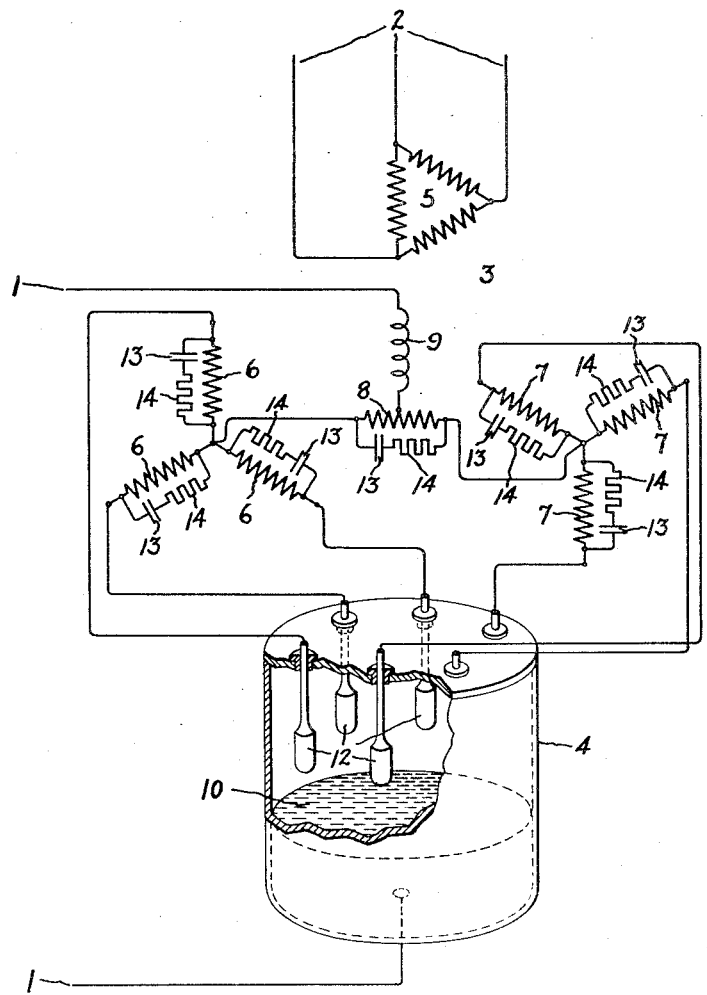
Inventor:
Herbert D. Brown,
by
His Attorney Patented Oct. 30, 1928.

1,689,518

UNITED STATES PATENT OFFICE.

HERBERT D. BROWN, OF SCHENECTADY, NEW YORK, ASSIGNOR TO GENERAL ELECTRIC COMPANY, A CORPORATION OF NEW YORK.

RECTIFYING SYSTEM.

Application filed February 5, 1927. Serial No. 166,232.

My invention relates to rectifying systems wherein power is interchanged between direct and alternating current circuits through means comprising a transformer and a vapor electric device, such as a mercury rectifier, and has for its principal object the provision of an improved means for protecting the transformer windings against the electrical disturbances caused by arc-back of the rectifier.

One of the chief difficulties encountered in the operation of mercury arc rectifiers is the formation of destructive arcs between positively and negatively charged anodes or between other parts of the rectifier. This phenomenon is commonly known as arc-back. The reasons for arc-back are not well understood, and largely because of this, no entirely satisfactory means has been heretofore provided for protecting the transformer windings and other apparatus against the electrical disturbances which these arcs occasion. In accordance with my invention this difficulty is avoided by the provision of damping or energy absorbing elements connected in shunt to the transformer windings.

My invention will be better understood from the following description when considered in connection with the accompanying drawing and its scope will be pointed out in the appended claims.

The drawing illustrates a rectifying system wherein my invention has been embodied.

This system comprises a direct current circuit 1 which is connected to an alternating current supply line 2 through means comprising a transformer 3 and a mercury rectifier 4. The transformer 3 comprises a primary winding 5 and secondary windings 6 and 7 which have their neutral points interconnected through an interphase transformer winding 8, one side of the direct current circuit 1 being connected through a smoothing reactor 9 to a terminal intermediate the ends of the windings 8. The rectifier 4 is provided with a vaporizable cathode 10 of mercury or the like and with a plurality of anodes 12 each of which of which is connected to a different terminal of the secondary windings 6 and 7.

Energy absorbing or damping elements each comprising a condenser 13 and a resistor 14 are connected in shunt to the interphase transformer winding 8 and in shunt to each of the various phase windings of the secondary circuit of the main transformer. The resistance of the resistors 14 will of course depend to some extent on the operating conditions but is preferably of a high value. It should be understood that the damping elements may be made of a resistor alone and that the condenser 13 may be omitted in cases where the resistor is capable of absorbing sufficient energy to protect the various windings.

Assuming the connections to be as illustrated and the circuit 1 to be energized by power supplied from the alternating current circuit 2, the voltage applied to the windings 6, 7 and 8 changes in value at a comparatively low rate and a comparatively small proportion of the total transmitted energy is absorbed in the damping elements 13—14. When arc-back occurs, however, the electrical conditions of the system are suddenly changed, and, due to the comparatively high reactance of the windings 6, 7 and 8 a large proportion of this energy is absorbed in the damping elements, thus preventing the building up of high voltages between the terminals of the windings.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is,—

1. The combination of a rectifier comprising a vaporizable cathode and a plurality of anodes, a transformer comprising secondary windings each connected to a different one of said anodes, and a plurality of damping means each connected in shunt to a different one of said windings.

2. The combination of a rectifier comprising a vaporizable cathode and a plurality of anodes, a transformer comprising a pair of polyphase windings provided with terminals each connected to a different one of said anodes, an interphase transformer connected between the neutrals of said polyphase windings and means comprising a resistor connected between the terminals of said interphase transformer.

3. The combination of a rectifier comprising a cathode and a plurality of anodes, a transformer provided with secondary windings each connected to a different one of said anodes, and a plurality of damping elements each connected in shunt to a different one of said windings and each comprising a condenser and a resistor connected in series with one another.

In witness whereof, I have hereunto set my hand this 4th day of February, 1927.

HERBERT D. BROWN.